United States Patent [19]
Plutowski

[11] Patent Number: 6,160,368
[45] Date of Patent: Dec. 12, 2000

[54] FASTER SPIN-DOWN OPERATION IN A DISK DRIVE BY UTILIZING PULSED BRAKING

[75] Inventor: Eugene F. Plutowski, Rochester, Minn.

[73] Assignee: Western Digital Corporation, Irvine, Calif.

[21] Appl. No.: 09/102,601

[22] Filed: Jun. 22, 1998

[51] Int. Cl.[7] .................................................. H02P 3/12
[52] U.S. Cl. ............................................ 318/375; 318/372
[58] Field of Search ..................................... 318/372, 375, 318/377; 360/75, 74.1, 78.03, 78.04, 73.03

[56] References Cited

U.S. PATENT DOCUMENTS

| | | | |
|---|---|---|---|
| 4,658,308 | 4/1987 | Sander, Jr. ............................. | 360/74.1 |
| 4,831,469 | 5/1989 | Hanson et al. ......................... | 360/75 |
| 5,091,680 | 2/1992 | Palm ...................................... | 318/368 |
| 5,495,372 | 2/1996 | Bahlmann et al. . | |
| 5,504,402 | 4/1996 | Menegoli . | |
| 5,821,717 | 10/1998 | Hassan et al. ......................... | 318/560 |
| 6,021,015 | 2/2000 | Jeffrey et al. ........................... | 360/69 |

Primary Examiner—Robert E. Nappi
Assistant Examiner—Rina I. Duda
Attorney, Agent, or Firm—Milad G. Shara

[57] ABSTRACT

A disk drive includes a spindle motor having windings and a spindle motor driver including switching elements connected to the windings. Spin-down instructions are stored in a memory. A microprocessor is responsive to a spin-down command to receive and execute the spin-down instructions. The execution of the spin-down instructions causes the microprocessor to perform the following pulsed braking sequence: (1) providing a brake signal for a first selected period of time (T1); (2) providing a coast signal for a second selected time period (T2); and (3) repeating (1) and (2). The spindle motor driver is responsive to the coast signal to control the switching elements to cause the spindle motor to coast and is responsive to the brake signal to control the switching elements to brake the spindle motor. The pulsed braking sequence preferably maximizes braking time and minimizes coasting time to reduce the time it takes to spin-the down spindle motor while still preventing heat related breakdown of components in spindle motor and power FETs in the spindle motor driver.

35 Claims, 6 Drawing Sheets

FASTER SPIN-DOWN OPERATION IN A DISK DRIVE BY UTILIZING PULSED BRAKING

BACKGROUND OF THE INVENTION

1. Field of the Invention

The present invention generally relates to reducing spin-down time in disk drives, and more particularly to an apparatus and method for reducing the time a spindle motor takes to spin-down in disk drives by pulse braking during a spin-down operation performed by the disk drive.

2. Description of the Prior Art

In hard disk drives, data is stored on magnetic media disks in concentric data tracks, which are divided into groups of data sectors. Disks are typically stacked on a spindle assembly. The spindle assembly is mechanically coupled to a spindle motor which rotates the disks at a high rate of speed. A spindle motor driver typically includes power field effect transistors (FETs) to drive the spindle motor. A microprocessor is typically employed to ascertain when to apply a run signal, a coast signal, or a brake signal to the spindle motor driver to control the operation of the spindle motor.

The torque developed ($T_d$) by the spindle motor is given by the following Equations I:

Equations I $$T_d = Kt^*I_m$$

$$Kt = Ke (Kt \text{ in } Nm/A; Ke \text{ in } V/rad/sec)$$

$$Bemf = Ke^*\omega$$

$$V_{applied} = V_{source} - Bemf = I_m^*(R_m + R_{fet})$$

$$I_m = (V_{source} - Ke^*\omega)/(R_m + R_{fet})$$

Where:

Td is the torque developed by spindle motor;

Kt is the Torque constant of spindle motor;

$I_m$ is spindle motor current;

Ke is the Voltage constant of the spindle motor i.e. the Bemf factor;

Bemf is the back emf of the spindle motor;

$\omega$ is the rotational velocity of the spindle motor;

$V_{applied}$ is the voltage applied to the spindle motor;

$V_{source}$ is the voltage of the spindle motor source supplying power to the spindle motor;

$R_m$ is the total resistance of the spindle motor and wire connections between the spindle motor and the power FETs; and $R_{fet}$ is the resistance in the power FETS that are turned on for controlling current $I_m$ flowing through the spindle motor.

During a dynamic braking of the spindle motor during a spin-down operation of the disk drive, windings of the spindle motor are shorted. With the windings shorted, there is no $V_{source}$ therefore, a negative $I_m$ and reverse braking $T_d$ are developed as given by the following Equations II:

Equations II $$I_m \text{ (During Dynamic Braking)} = -Bemf/(R_m + R_{fet}) = (-Ke^*\omega)/(R_m + R_{fet})$$

$$T_d \text{ (During Dynamic Braking)} = Kt^*I_m = Kt^*(-Ke^*\omega)/(R_m + R_{fet}) = (-Kt^2*\omega)/(R_m + R_{fet})$$

During dynamic braking, the rotational speed of the spindle motor at a given time ($\omega(t)$) is given by the following Equations III:

Equations III $$Td = \omega J = (-Kt^2*\omega)/(R_m + R_{fet})$$

$$\omega = (-Kt^2*\omega)/(J^*(R_m + R_{fet}))$$

$$\omega + [(Kt^2*\omega)/(J^*(R_m + R_{fet}))] = 0$$

Solving in the frequency domain:

$$S^*\omega(s) - \omega(0) + kt^2*\omega(s)/(J^*(R_m + R_{fet})) = 0$$

$$\omega(s)[S + kt^2/(J^*(R_m + R_{fet}))] = \omega(0)$$

$$\omega(s) = \omega(0)/[S + Kt^2/(J^*(R_m + R_{fet}))]$$

Using the Laplace Transform to solve for the time domain:

$$\omega(t) = \omega_0 e^{-kt/j^*(R_m + R_{fet})}$$

Where:

$\omega_0$ is the rotational velocity of the spindle motor at the start of dynamic braking;

J is moment of inertia of the spindle assembly.

Power dissipation in the windings of the spindle motor are given by the following Equation IV:

Equation IV $$P = I_m^2 * R_m$$

Power dissipation in the power FETs are given by the following Equation V:

Equation V $$P = I_m^2 * R_{fet}$$

As can be shown by Equations I–V above, if dynamic braking is used during the initial stages of a spin-down operation in the disk drive, the power dissipation, which is proportional to the square of $I_m$, is very high due to the high value of $\omega$. This very high power dissipation would cause a corresponding heating of the spindle motor windings, which can result in heat related breakdown of the spindle motor components, including the spindle motor windings. Moreover, the power FETs employed to drive the spindle motor are typically especially susceptible to heat related breakdown from heat generated by the power dissipated in the power FETs.

Present disk drives prevent heat related breakdown of components in the spindle motor and the spindle motor driver power FETs by coasting to a safe rotational velocity $\omega$ or safe Bemf level before dynamically braking to $\omega$=zero. One conventional way of coasting to a safe $\omega$ is for the microprocessor, which provides the coast and brake signals to the spindle motor driver, to provide the coast signal for a fixed delay interval after the start of a spin-down operation before providing the brake signal. Alternatively, the microprocessor reads the magnitude of $\omega$ from a speed detector/monitor and provides the coast signal until $\omega$ reaches the safe value. The coast period can be quite long. For example in a disk drive having a spindle motor that operates at 7200 revolutions per minute (RPMs), the coasting time can be six seconds or greater depending on inertial mass of the spindle system and drag torque. It is known to increase the RPM of the spindle motor to reduce rotational latency and increase disk transfer rate in the disk drive. However, as disk drives employ spindle motors operating at higher RPMs, a longer time period is needed to coast until a safe value of $\omega$ is reached. This long coast period not only results in a significantly longer spin-down operation, it also can cause transducer head and disk surface wear, which can reduce the mean time between failures (MTBF) of the disk drive.

When power supply energy fails, certain disk drives employ an emergency spin-down operation for generating an emergency auxiliary power supply during the spin-down of the spindle motor in response to the power failure. U.S. Pat. No. 5,504,402 to Menegoli (the '402 patent) and U.S. Pat. No. 5,495,372 to Bahlmann et al. (the '372 patent) describe such emergency auxiliary power supplies, which are energized by the spindle motor. However, the '402 patent and '372 patent are not directed to a normal spin-down operation where the microprocessor typically controls the spin-down of the spindle motor.

For example, in the '402 patent, a disk drive employs the kinetic energy stored in the rotating spindle assembly mass during a power failure to generate power to charge a voltage supply capacitor which provides power to a voice coil motor (VCM) to park the read-write head. A hardware circuit controls a switch, which switches on to short the windings of the spindle motor in order to provide a current path for current in the windings produced from the Bemf of the spindle motor. A current comparator compares the current in the windings to a reference current and turns off the switch to float the windings when the current rises above a maximum current threshold. A voltage comparator compares the voltage across the voltage supply capacitor with a reference voltage threshold and the hardware keeps the switch in the off position to continue floating the windings until the load discharges the voltage supply capacitor to a level below a comparator voltage threshold.

The period for shorting the windings depends on the maximum current threshold that is fixed in the hardware circuit. Also, the period for floating the windings depends on the voltage threshold that is fixed in the hardware circuit. Because the floating period depends on the voltage threshold for the voltage supply capacitor, the floating period can result in a longer spin-down operation. A longer spin-down time can be used for exploiting the kinetic energy stored in the spindle motor assembly mass to safely spin-down the disk drive. However, a longer spin-down operation can also cause transducer head and disk surface wear.

For reasons stated above, there is a need to reduce the time required to stop the spindle motor during the spin-down operation performed by the disk drive. In particular, there is a need to reduce the spin-down time without causing heat related breakdown of components in the spindle motor and the spindle motor driver power FETs. There is also a need to reduce the spin-down time without increasing the cost of the disk drive.

SUMMARY OF THE INVENTION

The invention can be regarded as an apparatus and method of performing a spin-down operation in a disk drive. The disk drive includes a spindle motor having a plurality of windings, and a spindle motor driver including switching elements connected to the plurality of windings. Spin-down instructions are stored in a memory. A microprocessor is responsive to a spin-down command to receive and execute the spin-down instructions. The execution of the spin-down instructions causes the microprocessor to cyclically execute the following operations: (1) providing a brake signal for a first selected period of time (T1); (2) providing a coast signal for a second selected time period (T2); and (3) repeating (1) and (2). The spindle motor driver is responsive to the coast signal to control the switching elements to cause the spindle motor to coast. The spindle motor driver is responsive to the brake signal to control the switching elements to brake the spindle motor.

Preferably, the spindle motor includes a rotor rotatable at variable magnitude rotational velocities, and the disk drive includes means for producing a speed-indicating signal representing the magnitude of the rotational velocity. The execution of the spin-down instructions preferably causes the microprocessor to perform the operations of cyclically reading the speed signal to determine whether the magnitude of the rotational velocity is within a range bounded by a selected upper rotational velocity ($\omega 1$) and a second selected lower rotational velocity ($\omega 2$); and within each cycle in which the magnitude of the rotational velocity is determined to be in the range, cyclically executing the operations of: (1) providing the brake signal for T1, (2) providing the coast signal for T2, and (3) repeating (1) and (2).

The execution of the spin-down instructions preferably causes the microprocessor to perform the operations of within each cycle in which the magnitude of the rotational velocity is determined to be lower than $\omega 2$, executing the subcycle operation of providing the brake signal.

Preferably, $\omega 2$ is selected to be a safe braking rotational velocity such that substantially no heat related breakdown of any portion of the spindle motor and the switching elements occurs when the spindle motor is repeatedly braked for T1 and coasted for T2 at velocities in the range, and continuously braked for time periods greater than T1 at velocities less than $\omega 2$.

Preferably, the means for producing the speed-indicating signal produces the speed-indicating signal when the spindle motor is coasting. The means for producing the speed-indicating signal includes means for detecting back emf zero crossings in the windings. Preferably, the means for producing the speed-indicating signal further includes means for determining one revolution of the spindle motor based on the number of back emf zero crossings, means for providing a fixed clock signal, means for counting a number of clock periods of the fixed clock signal in one revolution spindle motor, and means for storing the number of clock periods.

The disk drive according to the present invention reduces the time the spindle motor takes to spin-down in disk drives during the spin-down operation performed by the disk drive without causing heat related breakdown of components in the spindle motor and the spindle motor driver power FETs. By implementing the pulsed braking according to the present invention in a microprocessor, the cost of the disk drive according to the present invention is substantially the same cost a similar disk drive without the invention.

DESCRIPTION OF THE PREFERRED EMBODIMENTS

Figure 1:
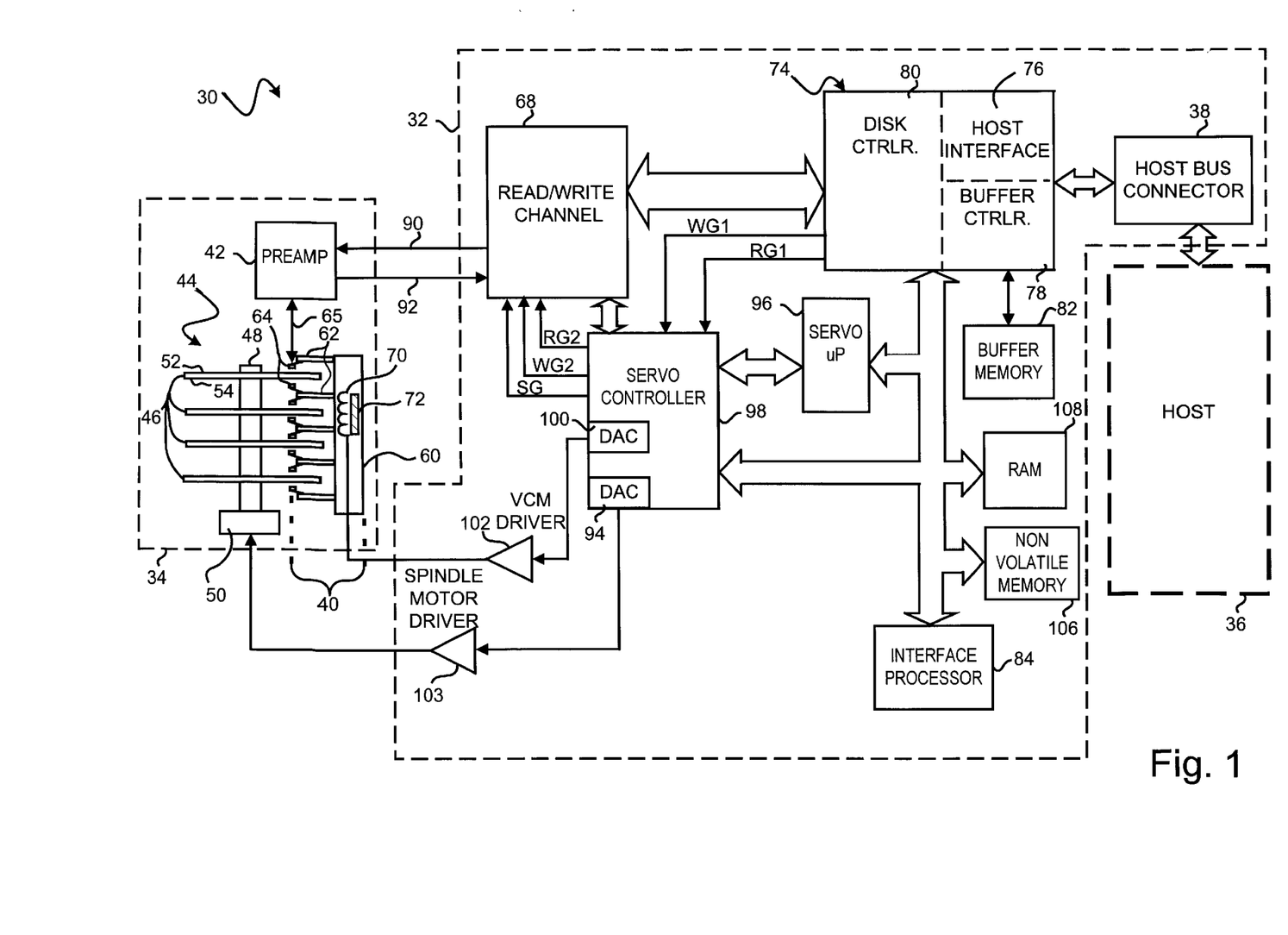
FIG. 1 is a block diagram of a hard disk drive o embodying the present invention.

A hard disk drive according to the present invention is illustrated generally at 30 in FIG. 1. Disk drive 30 includes a disk control system 32 and a head disk assembly (HDA) 34. Disk control system 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Data is transmitted between host system 36 and disk control system 32 via a host bus connector 38.

HDA 34 includes an actuator assembly 40, a preamplifier 42, and a disk assembly 44. Disk assembly 44 includes a plurality of magnetic media disks, such as indicated at 46. Disks 46 are stacked on a spindle assembly 48. Spindle assembly 48 is mechanically coupled to a spindle motor 50 for rotating disks 46 at a high rate of speed. Each disk 46 includes two disk recording surfaces (i.e., disk surfaces) capable of storing data thereon, such as indicated at 52 and 54.

Actuator assembly 40 includes a voice coil motor (VCM) 60 and multiple actuator arms 62 extending from VCM 60. Each actuator arm 62 corresponds to a respective disk surface, such as disk surface 52 and 54. A transducer head 64 is disposed at the end of each actuator arm 62 and each transducer head 64 is associated with a corresponding disk surface 52, 54. Transducer heads 64 communicate with disk control system 32 via preamplifier 42 for reading and writing data to the associated disk surface 52, 54. Preamplifier 42 is electrically coupled to transducer head 64 by connecting means, indicated at 65, for receiving and recording signals which are representative of magnetic transitions on a selected disk surface 52, 54. Preamplifier 42 provides an amplified signal to a read/write channel 68 of disk control system 32. The read/write channel 68 performs a coding and decoding of data written to and read from the disks 46.

VCM 60 includes a coil 70 moving in proximity to a permanent magnet 72. Actuator arms 62 are permanently coupled to VCM 60. VCM 60 controllably swings actuator arm 62 and their corresponding transducer heads 64 back and forth over their associated disk surface 52, 54 to access target data tracks formed on the associated disk surface.

Disk control system 32 includes an integrated circuit host interface and disk controller (HIDC) 74 having a host interface 76, a buffer controller 78 and a disk controller 80. Host interface 76 communicates with host system 36 via host bus connector 38 by receiving commands and data from and transmitting status and data back to host system 3 6. Buffer controller 78 controls a buffer memory 82 employed for storing data from host system 36 which is to be written to a disk surface (e.g., disk surface 52). In addition, buffer controller 78 controls buffer memory 82 for storing data read from disk surface 52. Host interface 76 provides for the data to be transmitted to and from the host system. Buffer memory 82 typically comprises random access memory (RAM), such as dynamic random access memory (DRAM). Disk controller 80 sends data to and receives data from read/write channel 68. Disk controller 80 also provides for error correction and error detection on data read from a disk surface.

An interface processor 84 handles the flow of data commands received by host interface 76 by sending commands to and reading status from disk controller 80. Interface processor 84 ascertains which commands to process from host system 36 and when to process these commands, and directs other tasks performed by disk controller 80.

Read/write channel 68 is coupled to preamplifier 42, indicated by read lines 90 and write lines 92. During a read operation, preamplifier 42 amplifies the transition pulses that are detected by a transducer head 64 associated with a disk surface and amplifies them to a signal level that can be processed by read/write channel 68. Read/write channel 68 receives the magnetic transition pulses read from the disk surface and further amplifies, filters and converts the transition pulses into digital data which is output to disk controller 80. During a write operation, the read/write channel 68 receives data from disk controller 80 and converts the data into pulses for writing data to a disk surface via write lines 92 and preamplifier 42. Preamplifier 42 generates current to drive the transducer head to write transitions on the disk surface.

A servo microprocessor 96 commands a servo controller 98 to control the position of transducer head 64 over disk 46 at a target data track for subsequent execution of read or write commands. Servo microprocessor 96 receives a representative form of a position signal sensed by transducer head 64, via preamplifier 42 and read/write channel 68 and performs calculations to position transducer head 64 relative to its associated disk surface. A digital signal-to-analog converter (DAC) 100 in servo controller 98 responds to digital commands from servo microprocessor 96 to provide a corresponding analog signal to VCM driver 102. VCM driver 102 responds to the analog signal from DAC 100 to provide a corresponding current to VCM 60. The current from VCM driver 102 is provided to coil 70 of VCM 60 and causes movement of actuator assembly 40 which in turn causes the attached actuator arms 62 to swing and thereby move transducer head 64 over an associated disk surface 52, 54 to access target data tracks.

Servo microprocessor 96 also provides commands to servo controller 98 to control the rotational velocity of spindle motor 50. Servo microprocessor 96 controls the rotational velocity of spindle motor 50 via servo controller 98 and a spindle motor driver 103 to maintain a substantially constant operational rotational velocity of rotating disks 46. Spindle motor 50 and the operation of servo microprocessor 96, servo controller 98, and spindle motor driver 103 for controlling spindle motor 50 are described in detail further in this specification.

Disk drive control system (including servo system) operational programs are stored in non-volatile memory 106, which may be read-only memory (ROM) or flash memory, and can be all or partially loaded into RAM 108 for execution from RAM 108 or both RAM 108 and non-volatile memory 106. Alternatively, system operational programs may be stored on reserve cylinders on disks 46. Upon startup of hard disk drive 30, disk drive programs, such as the servo system operational programs, are transferred into RAM 108 for fast access by servo microprocessor 96 for positioning transducer head 64 for execution of read and write commands.

In an exemplary operation of disk drive 30, servo microprocessor 96 receives a command to position actuator assembly 40 for accessing data or writing data on a specific target data track on a disk surface 52 or 54. In operation of disk drive 30, disk controller 80 keeps track of where transducer head 64 is circumferentially located over disk 46, and servo microprocessor 96 keeps track of which circular data track or "cylinder" of data tracks the transducer head is over, and maintains timing and keeps the transducer head tracking or following on the desired target data track.

The current circular data track position of transducer head 64 is stored in RAM 108 to permit servo microprocessor 96 to determine a required seek distance between the current data track and a target data track on disk 46. Based on the required seek distance, servo microprocessor 96 retrieves a corresponding read or write seek profile from RAM 108 and provides a digital signal command to DAC 100 corresponding to the seek profile. DAC 100 provides a corresponding analog signal to VCM driver 102 representative of the seek profiles. VCM driver 102 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of the servo sectors or "wedges" disposed on disk surface 52 or 54. Based on this position information, a position signal is provided via preamplifier 42, read/write channel 68, and servo controller 98 to servo microprocessor 96 to provide a representative position of transducer head 64 relative to its associated disk surface 52 or 54. Upon completion of a seek operation and the corresponding alignment of transducer head 64 over the target data track, a read or write command is executed to read data from or write to the target data track.

Figure 2A:
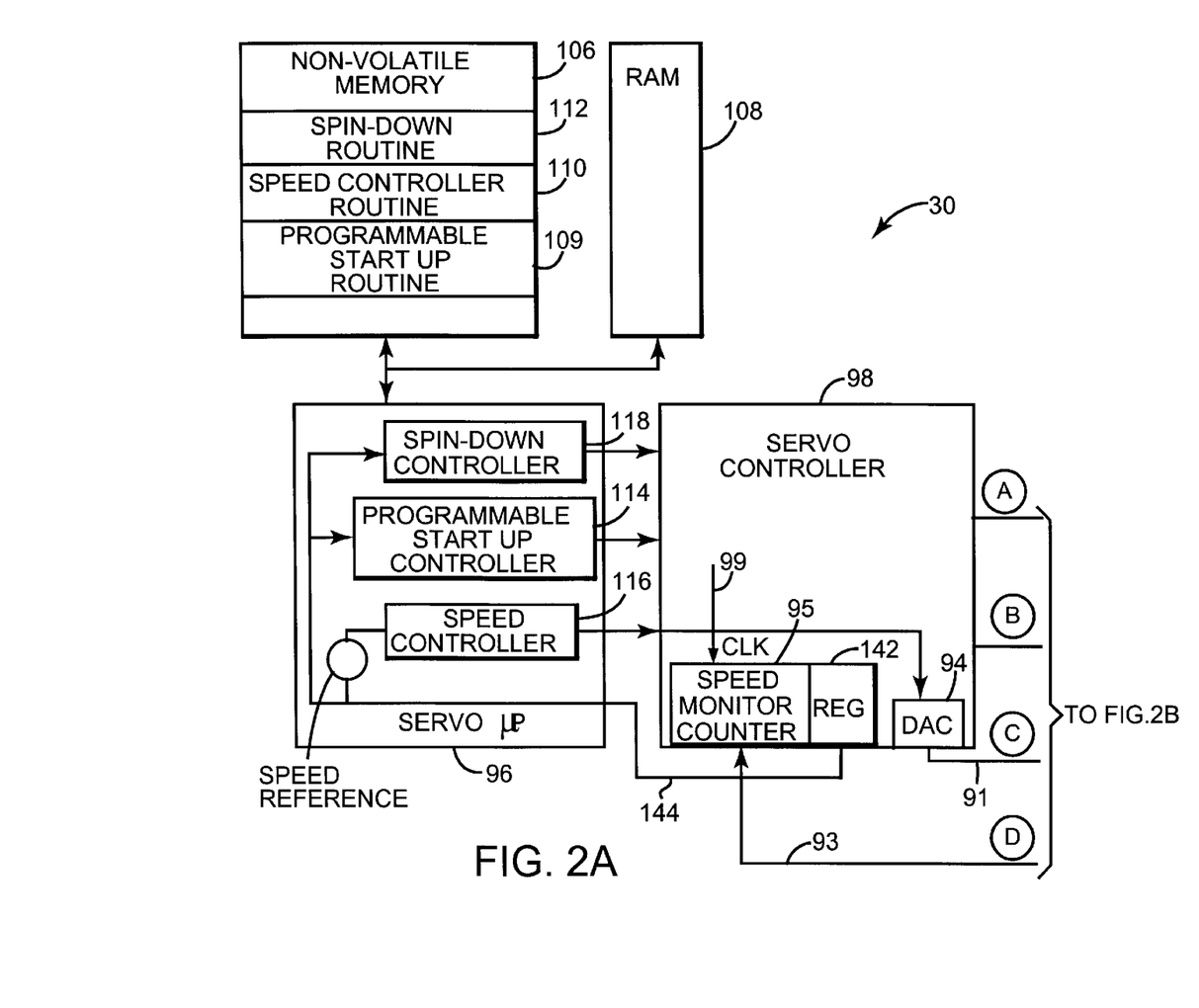
FIGS. 2A–B are a more detailed schematic block diagram of a portion of the hard disk drive of FIG. 1.
Figure 2B:
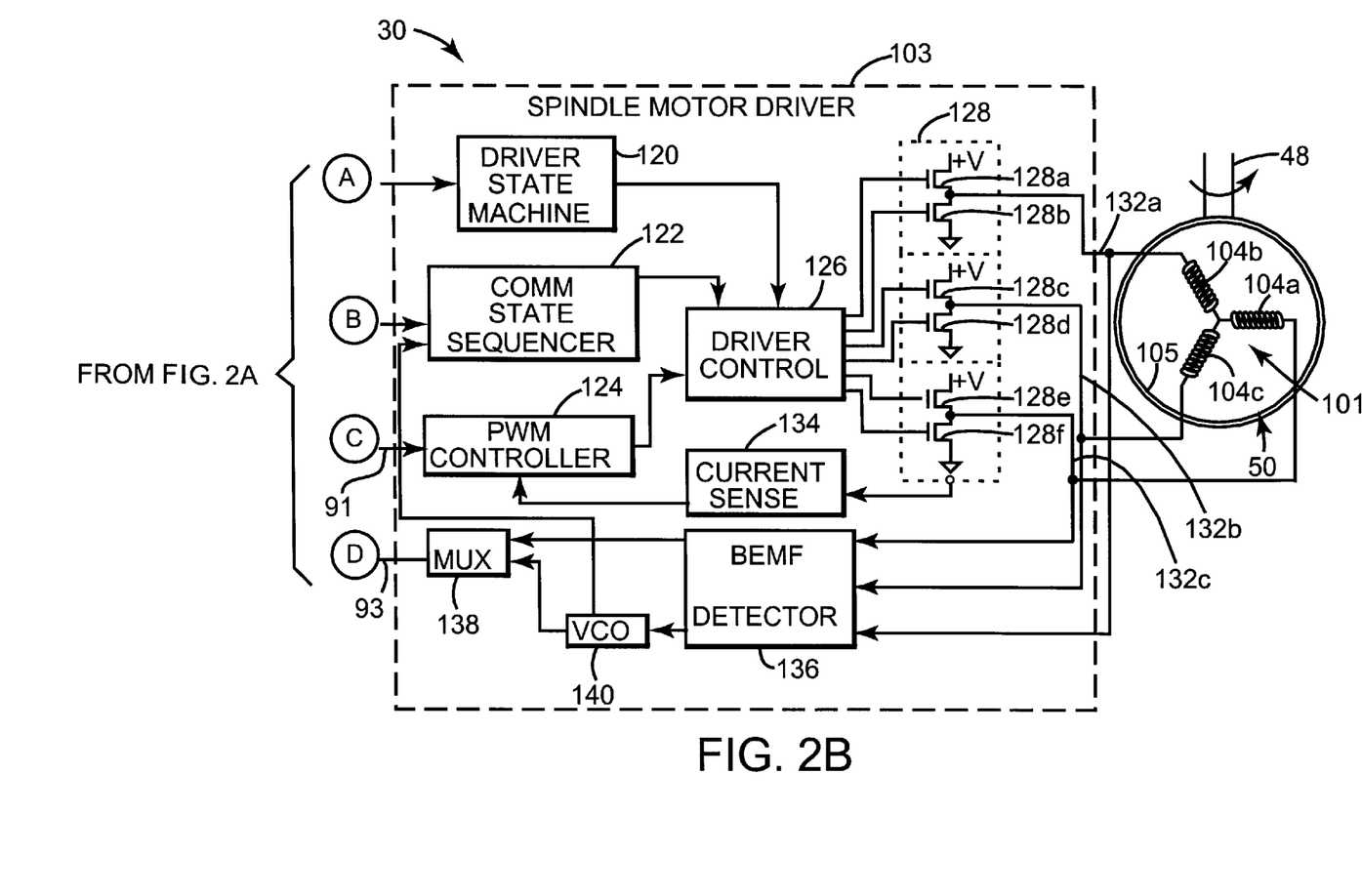

FIGS. 2A–B illustrate certain portions of disk drive 30 relevant to an embodiment of the present invention in more detail in schematic and block diagram form. The embodiment of spindle motor 50 illustrated in FIGS. 2A–B includes a stator 101 having three windings 104a, 104b, and 104c electrically arranged in a Y configuration, and a rotor 105. In one exemplary embodiment, spindle motor 50 is implemented in an eight pole, three-phase DC brushless motor.

Rotor 105 has magnets that provide a permanent magnetic field. Spindle motor 50 generates torque ($T_d$) on rotor 105 when current ($I_m$) flows through at least one of windings 104. $T_d$ depends upon the magnitude and direction of current flow through the windings 104, and the angular position of rotor 105 relative to stator 101. The functional relationship between torque and current flow and angular position is commonly depicted in a set of torque curves, each of which corresponds to a respective one of a set of commutation states.

Various firmware routines are stored in memory locations in non-volatile memory 106 for controlling the operation of spindle motor 50. For example, a programmable startup routine 109, a speed controller routine 110, and a spin-down routine 112 are stored in non-volatile memory 106 for controlling spindle motor 50 during start-up, running, and spin-down of spindle motor 50. Servo microprocessor 96 preferably comprises a digital signal processor that runs routines 109, 110, and 112 to control spindle motor 50. During start-up of spindle motor 50, servo microprocessor 96 responds to a startup command to receive and execute programmable startup instructions from programmable start-up routine 109 of non-volatile memory 106 to form a programmable start-up controller 114 within servo microprocessor 96.

Similarly, during the running of spindle motor 50, servo microprocessor 96 receives and executes speed controller instructions from speed controller routine 110 of non-volatile memory 106 to form a speed controller 116 within servo microprocessor 96.

A spin-down command to spin-down spindle motor 50 is initiated by the host computer. Alternatively, the spin-down command is initiated by a failure condition in disk drive 30. Servo microprocessor 96 responds to the spin-down command to receive and execute spin-down instructions from spin-down routine 112 to form a spin-down controller 118 within servo microprocessor 96. Servo microprocessor 96 provides spindle motor control signals to servo controller 98 which are generated by programmable start-up controller 114 during start-up operations, by speed controller 116 during normal run operations, and by spin-down controller 118 during spin-down operations. Example spindle motor control signals include a run signal for controlling the running of spindle motor 50, a coast signal to trigger spindle motor 50 to coast, and a brake signal which triggers spindle motor 50 to brake.

Servo controller 98 interprets the spindle motor control signals and provides a representative form of the control signals to a driver state machine 120. In one embodiment of disk drive 30, driver state machine 120 can be in one of five distinct logical states at a given time. The logical states include a start state, a run state, a coast state, a brake state, and a preset state. The preset state is selected for initializing a commutation state sequencer 122 prior to starting spindle motor 50. During the start state and run state, commutation state sequencer 122 sequences through a set of six commutation states corresponding to a set of torque curves to control switching elements 128 which drives spindle motor 50 via a driver control 126 to maximize the peak positive torque produced by spindle motor 50.

During the run state, speed controller 116 within servo microprocessor 96 provides commands to a DAC 94 in servo controller 98. DAC 94 responds to the commands from servo microprocessor 96 to provide an analog signal on a line 91 to a PWM controller 124 in spindle motor driver 103. PWM controller 124 provides high-frequency chopping of signals generated by power driver control circuit 126 to control current flowing through switching elements 128. Power driver control circuit 126 has six lines which are each coupled to a gate of a corresponding one of power field effect transistors (FET) 128a, 128b, 128c, 128d, 128e, and 128f.

Power FETs 128a–f form switching elements 128. Suitably, the drain of power FET 128a is coupled to the positive power supply and its source is coupled to winding 104b via a line 132a. Power FET 128a is paired with power FET 128b, which has its source coupled to ground and its drain coupled to winding 104b via line 132a. Similarly, power FET 128c has its drain coupled to the positive power supply and its source is coupled to winding 104c via a line 132b, and is paired with power FET 128d which has its source coupled to ground and its drain coupled to winding 104c via a line 132a. Power FET 128e has its drain coupled to the positive power supply and its source coupled to winding 104a via a line 132c, and is paired with power FET 128f which has its source coupled to ground and its drain coupled to winding 104a via line 132c.

In one example embodiment of disk drive 30, commutation state sequencer 122 operates in a bipolar mode and via driver control 126 switches on two power FETs 128 on opposite legs of windings 104 during each of the commutation run states so that current flows through two of the windings. For example, driver control 126 switches on power FETs 128a and 128d so that current flows from winding 104b to winding 104c. In this example, power FET 128e and 128f are shut off so that no current flows through winding 104a, resulting in a floating winding. Thus, there is one floating winding for three-phase spindle motor 50 during each of the six commutation run states.

Current sense circuit 134 senses current flow through the switched on power FETs 128 and provides a feedback signal to PWM controller 124 for controlling the current flowing through the switched on FETs 128. During the example run operation where two power FETs 128 on opposite legs of windings 104 are switched on during each of the commutation run states, PWM controller 124 controls the current flowing through the switched on power FETs 128. If current sense circuit 134 indicates too much current flowing through the switched on power FETs 128, PWM controller 124 overrides commutation state sequencer 122 to shut power FETs 128 off until the current is at a more appropriate level.

A Bemf detector 136 monitors a Bemf of spindle motor 50 and provides a Bemf zero crossing signal to a multiplexer 138 and a voltage controlled oscillator (VCO) 140. During coasting operations, Bemf detector 136 monitors Bemf from at least one of the windings 104 and provides the Bemf zero crossing signal, which is substantially noise free during coasting operations, to a first input of multiplexer 138 which is selected to be provided to servo controller 98 on a line 93 as a Bemf zero crossing signal representative of the bemf of spindle motor 50. During run operations, Bemf detector 136 monitors the Bemf from the floating phase winding 104 and provides a somewhat noisy Bemf zero crossing signal to VCO 140. During the run phase, VCO 140 rejects high frequency noise from the Bemf zero crossing signal and provides this filtered signal to a second input of multiplexor 138 which is selected to be provided as the Bemf zero crossing signal on line 93 to servo controller 98.

A speed monitor counter 95 in servo controller 98 uses the zero crossings in the Bemf zero crossing signal on line 93 to determine one revolution of spindle motor 50. For example, in an eight pole, three-phase spindle motor 50, there are 24 zero crossings included in one revolution of the spindle motor. Speed monitor counter 95 counts a number of clock periods of a fixed clock signal on line 99 occurring in one revolution of spindle motor 50. This number of clock periods of the fixed clock signal on line 99 represents the magnitude of the rotational velocity ($\omega$) of spindle motor 50 and is stored in a register 142 in speed monitor counter 95. Register 142 is updated once per revolution and the magnitude value of $\omega$ stored in register 142 is provided as a speed-indicating signal on a line 144 to servo microprocessor 96.

In run mode, servo microprocessor 96 serves as speed controller 116 to execute speed controller routine 110 out of non-volatile memory 106 and RAM 108. Servo microprocessor 96 functioning as speed controller 116 reads the speed-indicating signal on line 144 and uses the $\omega$ magnitude value represented in the speed-indicating signal for controlling $\omega$ of spindle motor 50 via servo controller 98 to maintain a substantially constant rotational velocity of disk 50. A speed reference (desired speed) is used by speed controller 116 to provide a digital signal to DAC 94 in servo controller 98, which provides the analog signal on line 91 to PWM controller 124 which controls the current flowing through the switched on power FETs 128 during run operations based on the difference between the speed reference and the value of the speed-indicating signal on line 144. Commutation state sequencer 122 operates during start-up and run operations by sequencing through commutation states to control which of power FETs 128 are switched on and which are switched off so that a substantially peak positive torque will be generated for rotor 105 of spindle motor 50.

During a coast operation of disk drive 30, all of the power FETs 128 are off so that the windings 104 of spindle motor 50 are floating and substantially only frictional forces slow down spindle motor 50. During a dynamic braking operation of disk drive 30, the power FETs 128 are turned on in such a way to short windings 104 of spindle motor 50. The dynamic braking operation of a spindle motor is described in detail along with corresponding Equations I–V in the Background of the Invention section of the present specification.

As discussed in Background of the Invention section, if dynamic braking is used during the initial stages of a spin-down operation in the disk drive, the power dissipation, which is proportional to the square of current in spindle motor 50, is very high due to the high value of $\omega$. This very high power dissipation would cause a corresponding heating of the spindle motor windings, which can result in heat related breakdown of the spindle motor components, including the spindle motor windings. Moreover, the power FETs employed to drive the spindle motor are typically especially susceptible to heat related breakdown from heat generated by the power dissipated in the power FETSs (switching elements 128).

During a spin-down operation of disk drive 30 according to an embodiment of the present invention, servo microprocessor 96 serves as spin-down controller 118 to execute spin-down controller routine 112 out of non-volatile memory 106 and RAM 108. Any variables created by servo microprocessor 96 functioning as spin-down controller 118 need to be stored in RAM 108 because non-volatile memory is not re-programmed during the operation of disk drive 30. Servo microprocessor 96 functioning as spin-down controller 118 reads the speed-indicating signal on line 144 and uses the $\omega$ magnitude value represented in the speed-indicating signal for determining when to coast, pulse brake, or brake spindle motor 50 to reduce the time spindle motor 50 takes to spin-down from an operating $\omega$ to a $\omega$=zero. At the same time, microprocessor 96 functioning as spin-down controller 118 uses the $\omega$ magnitude value represented in the speed-indicating signal 144 to prevent heat related breakdown of components in spindle motor 50 and the spindle motor driver power FETs 128 by performing a initial optional coast sequence, then performing a pulsed braking sequence having a duty cycle of braking and coasting. The pulsed braking sequence preferably maximizes braking time and minimizes coasting time to reduce the time it takes to spin-down spindle motor 50 while still preventing heat related breakdown of components in spindle motor 50 and the spindle motor driver power FETs 128. After performing the pulsed braking sequence to a safe $\omega$ (or safe Bemf), a full time brake sequence is performed by continuously dynamically braking to $\omega$=zero. (2). Suitably, the pulsed braking sequence includes cyclically executing the steps of (1) dynamic braking of spindle motor 50 for a brake time T1, (2) coasting spindle motor 50 for a coast time T2; and (3) repeating steps (1).

One example of an operation of a microprocessor 96 functioning as spin-down controller 118 executing spin-down routine 112 instructions from non-volatile memory 106 and RAM 108 is as follows:

1. Coast spindle motor 50 from a $\omega 0$ to a $\omega 1$.
2. Pulse brake spindle motor 50 at a selected duty cycle from $\omega 1$ to a $\omega 2$.
3. After $\omega 2$, engage full time dynamic braking to brake spindle motor 50 to zero (rest).

Figure 7:
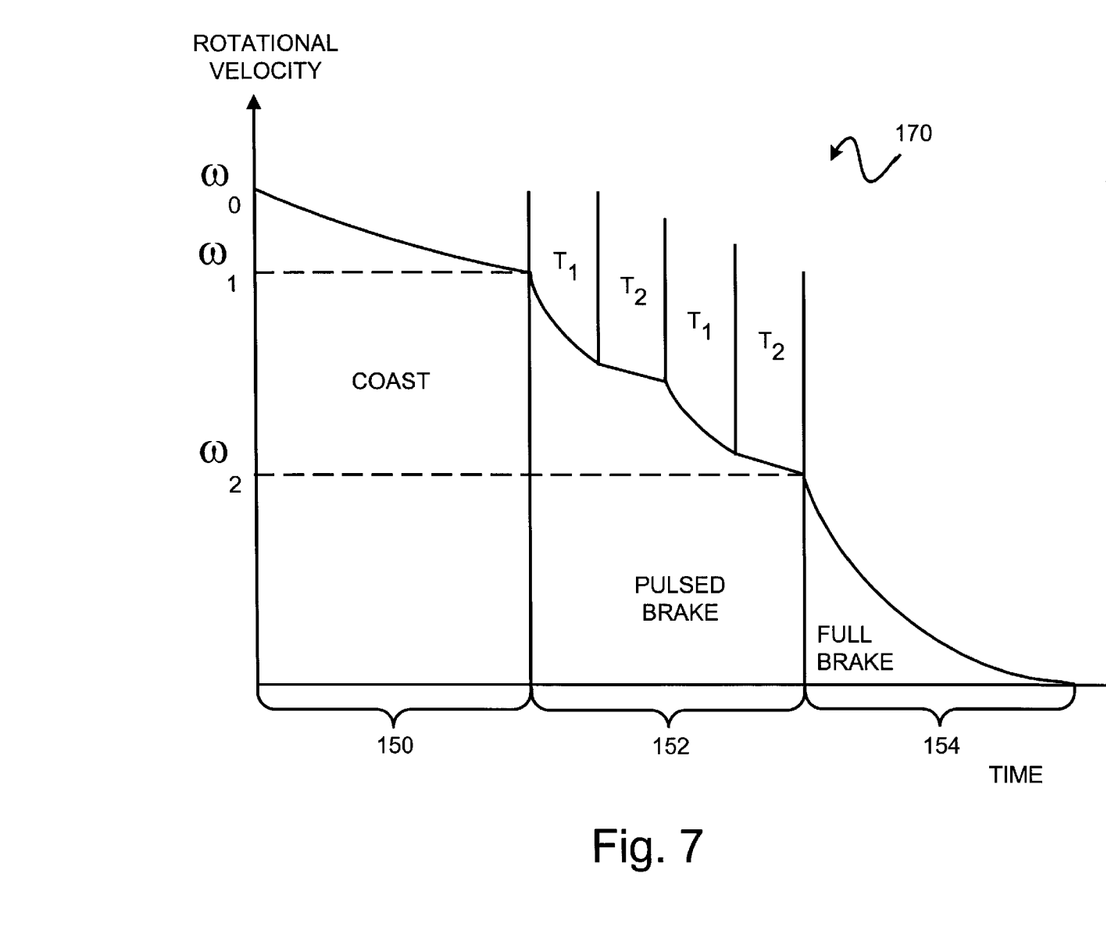
FIG. 7 shows a velocity curve representing the rotational velocity $\omega$ of the spindle motor in the disk drive of FIG. 1.

FIG. 7 shows a velocity curve 170 representing the rotational velocity $\omega$ of spindle motor 50 during execution of spin-down routine 112. Spin-down routine 112 has a full time coasting interval 150 for coasting spindle motor 50 from ω0 to a ω1; a pulsed braking interval 152 for pulsed braking of spindle motor 50 at a selected duty cycle from ω1 to a ω2; and after ω2, a full time braking interval 154 for full time dynamic of braking spindle motor 50 to zero rotational velocity (rest).

An example pseudo code for spin-down routine 112 is as follows:

---

Set Initial_Time = value of a free running timer in servo microprocessor 96;
Elapsed_Time = Free running timer value - Intial_Time;
Monitored_ω = magnitude value read from speed-indicating signal on line 144 during coasting of spindle motor 50;
While (Monitored_ω = is greater than or equal to ω1)
{
    Apply coast signal to coast spindle motor 50;
}
While (Monitored_ω is greater than or equal to ω2)
{
    Reset Initial_Time = free running timer value;
    Apply brake signal to brake spindle motor 50;
    If Elapsed_Time = Delay_Brake_Time (T1),
        Stop applying brake signal;
    Reset Initial_Time = free running timer;
    Apply coast signal to coast spindle motor 50;
    If Elapsed_Time = Delay_Coast_Time (T2),
        Stop applying coast signal and jump to apply brake sequence;
}
If Monitored_ω is less than ω2,
    Apply brake signal to brake spindle motor 50 until ω = 0 or until spin-down routine is stopped.

---

In one embodiment of disk drive 30 of the present invention, the values Delay_Brake_Time (T1) and Delay_Coast_Time (T2) are fixed, which produces a fixed pulsed brake duty cycle. In an alternative embodiment of disk drive 30, the values of Delay_Brake_Time (T1) and Delay_Coast_Time (T2) are variable, which produces a variable pulsed braking duty cycle. In one example embodiment of disk drive 30, the variable duty cycle is varied from an initial duty cycle which is 0% braked (i.e., 100% coasting) which is gradually increased to a duty cycle which is 100% braked (i.e., 0% coasting) to prevent heat related breakdown of components in spindle motor 50 and the spindle motor driver power FETs 128.

The values of ω0, ω1, and ω2 can be fixed values or can be varied. The value ω2 is selected to be a safe braking rotational velocity. The value of ω2 is considered to be a safe braking rotational velocity because substantially no heat related breakdown of any portion of spindle motor 50 and switching elements 128 occurs when spindle motor 50 is repeatedly braked for the Delay_Brake_Time (T1) at rotational velocities greater than ω2 and less than ω1, and when spindle motor 50 is continuously braked for time periods greater than Delay_Brake_Time (T1) at rotational velocities less than ω2.

Figure 3:
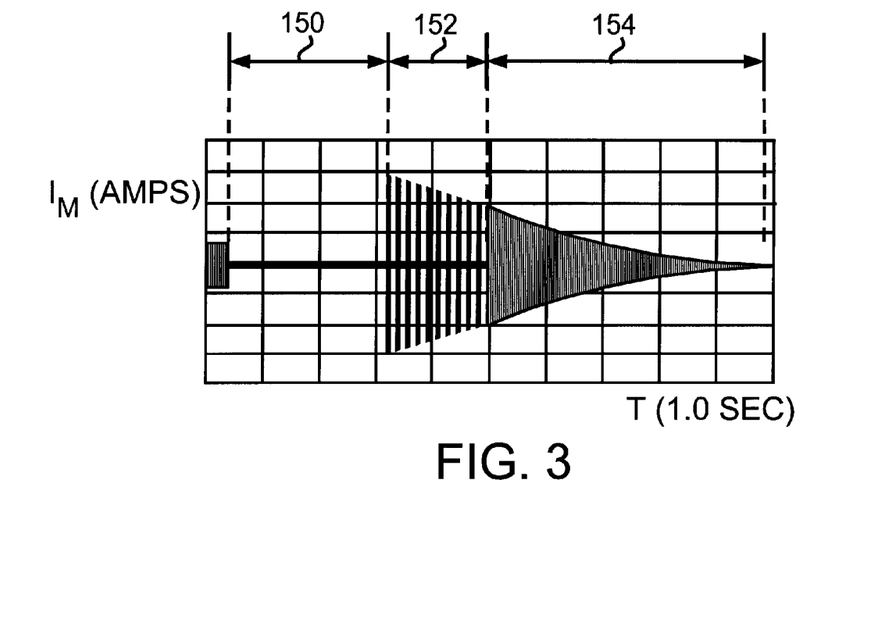
FIG. 3 is a timing diagram plotting one of three phase currents for a three-phase spindle motor for a coasting interval, pulse braking interval, and full braking interval according to an embodiment of the present invention.

FIG. 3 illustrates a timing diagram for one of three phase currents ($I_m$) in 1.0 amps per division versus time in 1.0 sec per division for three-phase spindle motor 50 for a complete spin-down operation embodying the present invention. A full time coasting sequence is indicated by arrows 150. A pulsed braking sequence is indicated by arrows 152. A full time braking sequence is indicated by arrows 154. As illustrated in FIG. 3 and represented by Equations I–V above, the $I_m$ during the braking of spindle motor declines as the spindle motor ω is reduced so that it is safe to pulse brake in the pulsed braking interval indicated by arrows 152 and safe to full time brake in the full time braking interval indicated by arrows 154 without causing heat related breakdown of components in spindle motor 30 and the power FETs 128

Figure 4:
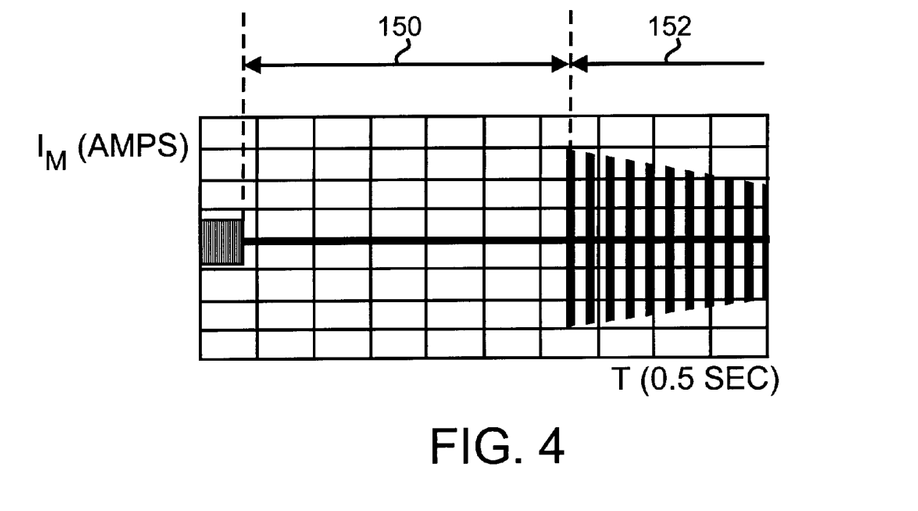
FIG. 4 is a timing diagram showing the coast interval prior to the pulse braking interval in the timing diagram of FIG. 3.

FIG. 4 illustrates a timing diagram for one of three phase currents ($I_m$) in 1.0 amps per division versus time in 0.5 sec per division for three-phase spindle motor 50 for the coast sequence indicated by arrows 150 and for a portion of the pulsed braking sequence indicated by arrows 152. FIG. 4 shows the phase current $I_m$ during the coasting interval and a portion of the pulse braking interval shown in the timing diagram of FIG. 3.

Figure 5:
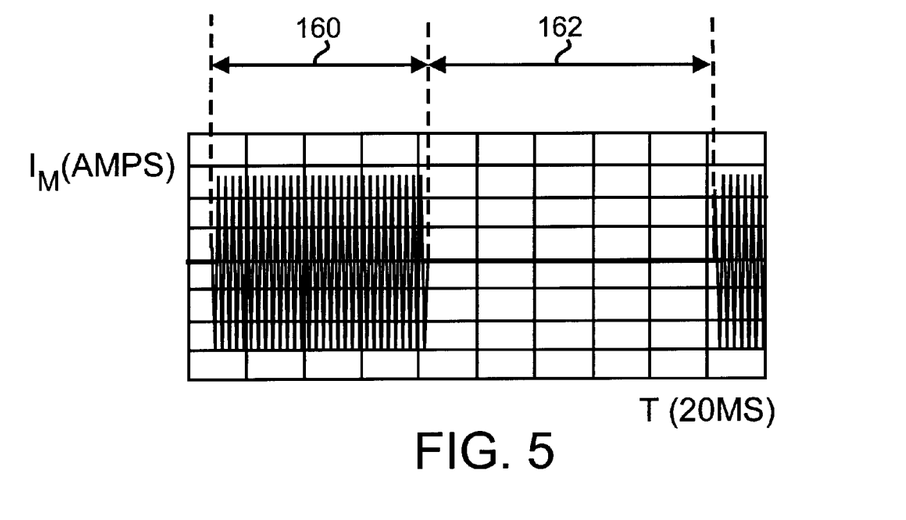
FIG. 5 is a timing diagram showing the duty cycle of a portion of the pulse braking interval in the timing diagram of FIG. 3.

FIG. 5 illustrates a timing diagram for one of three phase currents ($I_m$) in 1.0 amps per division versus time in 20.0 ms per division for three-phase spindle motor 50 for a portion of the pulsed braking sequence indicated by arrows 152 in FIG. 3. The portion of the pulsed braking sequence illustrated in FIG. 5 includes a braking interval indicated by arrows 160 (corresponding to Delay_Brake_Time (T1) in the above pseudo code) and a coasting interval indicated by arrows 162 (corresponding to Delay_Coast_Time (T2) in the above pseudo code). In the embodiment illustrated in FIG. 5, the pulsed braking sequence has a duty cycle of approximately 43% braked (i.e., approximately 57% coasting).

Figure 6:
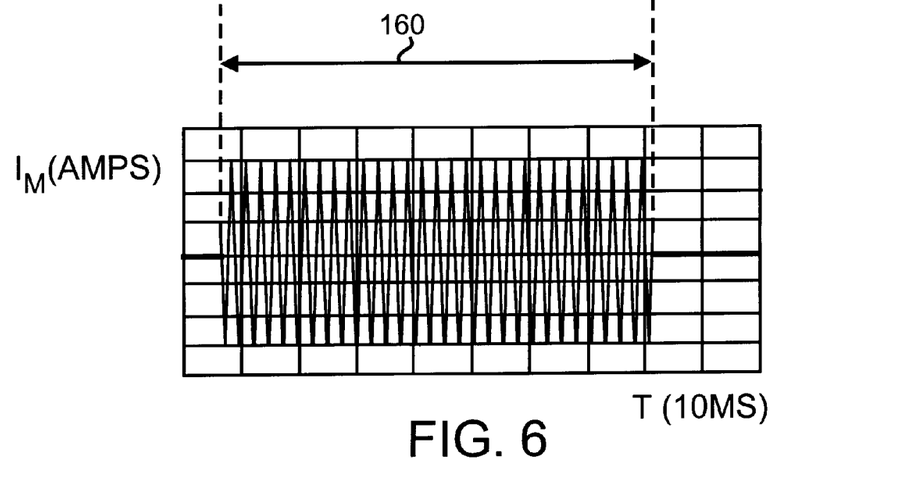
FIG. 6 is a timing diagram showing the braking pulse in the timing diagram of FIG. 5.

FIG. 6 illustrates a timing diagram for one of three phase currents ($I_m$) in 1.0 amps per division versus time in 10.0 ms per division for three-phase spindle motor 50 for the braking interval 160 during a portion of the pulsed braking sequence indicated by arrows 152 in FIG. 3. FIG. 6 illustrates the sinusoidal nature of the $I_m$ braking waveform during braking interval 160.

The disk drive 30 according to the present invention employs pulsed braking to significantly reduce the time the spindle motor takes to spin-down during the spin-down operation performed by the disk drive without causing heat related breakdown of components in spindle motor 30 and the power FFTs 128. Because the spin-down routine 112 is executed by servo microprocessor 96, there is substantially no increase in the cost of disk drive 30 as compared to a similar disk drive not having the spin-down pulse braking capabilities according to the present invention. Moreover, the significantly reduced spin-down operation of disk drive 30 according to the present invention, significantly reduces transducer head 64 and disk surface 52/54 wear, which can increase the mean time between failure (MTBF) of disk drive 30.

I claim:

1. A disk drive comprising:

a spindle motor having a plurality of windings;

a spindle motor driver including switching elements connected to the plurality of windings;

means for storing spin-down instructions;

means for initiating a spin-down command;

a microprocessor responsive to the spin-down command to receive and execute the spin-down instructions, wherein the execution of the spin-down instructions causes the microprocessor to cyclically perform the following operations:

(1) providing a brake signal for a first selected period of time (T1),         (2) providing a coast signal for a second selected time period (T2), and         (3) repeating (1) and (2);

the spindle motor driver being responsive to the coast signal to control the switching elements to cause the spindle motor to coast and being responsive to the brake signal to control the switching elements to brake the spindle motor.

2. The disk drive of claim 1 wherein the spindle motor includes a rotor rotatable at a variable magnitude rotational velocity, and the disk drive further comprises:

means for producing a speed-indicating signal representing the magnitude of the rotational velocity; and     wherein the execution of the spin-down instructions causes the microprocessor to perform the operations of:

reading the speed signal to determine whether the magnitude of the rotational velocity is within a range bounded by a selected upper rotational velocity ($\omega 1$) and a second selected lower rotational velocity ($\omega 2$);

while the magnitude of the rotational velocity is determined to be in the range, cyclically executing the operations of:

(1) providing the brake signal for T1,             (2) providing the coast signal for T2, and             (3) repeating (1) and (2).

3. The disk drive of claim 2 wherein the execution of the spin-down instructions causes the microprocessor to perform the operations of:

within each cycle in which the magnitude of the rotational velocity is determined to be lower than $\omega 2$, executing the following subcycle operation:

(1) providing the brake signal.

4. The disk drive of claim 2 wherein $\omega 2$ is selected to be a safe braking rotational velocity such that substantially no heat related breakdown of any portion of the spindle motor and the switching elements occurs when the spindle motor is repeatedly braked for T1 and coasted for T2 at velocities in the range, and continuously braked for time periods greater than T1 at velocities less than $\omega 2$.

5. The disk drive of claim 2 wherein the execution of the spin-down instructions causes the microprocessor to further perform the operation of:

within each cycle in which the magnitude of the rotational velocity is determined to be higher than $\omega 1$, executing the following subcycle operation:

(1) providing the coast signal.

6. The disk drive of claim 2 wherein $\omega 1$ is equal to a maximum rotational velocity of the spindle motor.

7. The disk drive of claim 1 wherein T1 and T2 are fixed.

8. The disk drive of claim 1 wherein T1 and T2 are variable.

9. The disk drive of claim 2 wherein means for producing the speed-indicating signal produces the speed-indicating signal when the spindle motor is coasting.

10. The disk drive of claim 2 wherein means for producing the speed-indicating signal includes:

means for detecting back emf zero crossings in the windings.

11. The disk drive of claim 2 wherein the means for producing the speed-indicating signal further includes:

means for determining one revolution of the spindle motor based on the number of back emf zero crossings;

means for providing a fixed clock signal;

means for counting a number of clock periods of the fixed clock signal in one revolution of the spindle motor; and     means for storing the number of clock periods.

12. A disk drive comprising:

a spindle motor having a plurality of windings and a rotor rotatable at a variable magnitude rotational velocity;

a spindle motor driver including switching elements connected to the plurality of windings;

means for producing a speed-indicating signal representing the magnitude of the rotational velocity;

means for storing spin-down instructions;

means for initiating a spin-down command;

a microprocessor responsive to the spin-down command to receive and execute the spin-down instructions, wherein the execution of the spin-down instructions causes the microprocessor to perform the following cycle and sub-cycle operations of:

cyclically reading the speed signal to determine whether the magnitude of the rotational velocity is within a range bounded by a selected upper rotational velocity ($\omega 1$) and a second selected lower rotational velocity ($\omega 2$);

within each cycle in which the magnitude of the rotational velocity is determined to be in the range, cyclically executing the following subcycle operations of:

(1) providing a brake signal for a first selected period of time (T1),             (2) providing a coast signal for a second selected time period (T2), and             (3) repeating (1) and (2);

within each cycle in which the magnitude of the rotational velocity is determined to be lower than the range, executing the following subcycle operation:

(1) providing the brake signal; and     the spindle motor driver being responsive to the coast signal to control the switching elements to cause the spindle motor to coast and being responsive to the brake signal to control the switching elements to brake the spindle motor.

13. The disk drive of claim 12 wherein $\omega 2$ is selected to be a safe braking rotational velocity such that substantially no heat related breakdown of any portion of the spindle motor and the switching elements occurs when the spindle motor is repeatedly braked for T1 and coasted for T2 at velocities in the range, and continuously braked for time periods greater than T1 at velocities less than $\omega 2$.

14. The disk drive of claim 12 wherein the execution of the spin-down instructions causes the microprocessor to further perform the operation of:

within each cycle in which the magnitude of the rotational velocity is determined to be higher than $\omega 1$, executing the following subcycle operation:

(1) providing the coast signal.

15. The disk drive of claim 12 wherein $\omega 1$ is equal to a maximum rotational velocity of the spindle motor.

16. The disk drive of claim 12 wherein T1 and T2 are fixed.

17. The disk drive of claim 12 wherein T1 and T2 are variable.

18. The disk drive of claim 12 wherein means for producing the speed-indicating signal produces the speed-indicating signal when the spindle motor is coasting.

19. The disk drive of claim 12 wherein means for producing the speed-indicating signal includes:

means for detecting back emf zero crossings in the windings.

20. The disk drive of claim 19 wherein the means for producing the speed-indicating signal further includes:

means for determining one revolution of the spindle motor based on the number of back emf zero crossings;

means for providing a fixed clock signal;

means for counting a number of clock periods of the fixed clock signal in one revolution of the spindle motor; and     means for storing the number of clock periods.

21. A method for spinning down a spindle motor in a disk drive, the method comprising the steps of:
 a. initiating a spin-down operation;
 b. monitoring a rotational velocity of the spindle motor;
 c. while the monitored rotational velocity of the spindle motor is less than a first selected rotational velocity ($\omega 1$) and greater than or equal to a second selected rotational velocity ($\omega 2$):
  (1) braking the spindle motor with a braking mechanism for a first selected period of time (T1),
  (2) coasting the spindle motor for a second selected period of time (T2), and
  (3) repeating steps c(1) and c(2); and
 d. selecting $\omega 2$ to be a safe braking rotational velocity such that substantially no heat related breakdown of any portion of the spindle motor and the breaking mechanism occurs when the spindle motor is repeatedly braked for T1 and coasted for T2 at velocities in the range, and continuously braked for time periods greater than T1 at rotational velocities less than $\omega 2$.

22. The method of claim 21 further comprising the step of:
 while the monitored rotational velocity of the spindle motor is greater than or equal to $\omega 1$, coasting the spindle motor.

23. The method of claim 21 further comprising the step of:
 if the monitored rotational velocity of the spindle motor is less than $\omega 2$, braking the spindle motor to reduce the rotational velocity of the spindle motor to zero.

24. The method of claim 21 wherein $\omega 1$ is equal to a maximum rotational velocity of the spindle motor.

25. The method of claim 21 wherein the monitoring step is performed during a coasting of the spindle motor.

26. The method of claim 21 wherein T1 and T2 are fixed.

27. The method of claim 21 wherein T1 and T2 are variable.

28. A method for spinning down a spindle motor in a disk drive, the method comprising the steps of:
 a. monitoring a rotational velocity of the spindle motor;
 b. storing spin-down instructions;
 c. initiating a spin-down operation in a microprocessor, the spin-down operation including receiving and executing the spin-down instructions to cause the microprocessor to perform the following steps:
  (1) reading the monitored rotational velocity of the spindle motor; and
  (2) while the monitored rotational velocity of the spindle motor is less than a first selected rotational velocity ($\omega 1$) and greater than or equal to a second selected rotational velocity ($\omega 2$):
   (i) providing a brake signal for a first selected period of time (T1),
   (ii) providing a coast signal for a second selected time period (T2), and
   (iii) repeating steps c(2)(i) and c(2)(ii);
 d. coasting the spindle motor in response to the coast signal; and
 e. braking the spindle motor in response to the brake signal.

29. The method of claim 28 wherein the braking step is performed by a braking mechanism and the method further comprises the step of:
 selecting $\omega 2$ to be a safe braking rotational velocity such that substantially no heat related breakdown of any portion of the spindle motor and the breaking mechanism occurs when the spindle motor is repeatedly braked for T1 and coasted for T2 at velocities in the range, and continuously braked for time periods greater than T1 at rotational velocities less than $\omega 2$.

30. The method of claim 28 further comprising the step of:
 while the monitored rotational velocity of the spindle motor is greater than or equal to $\omega 1$, coasting the spindle motor.

31. The method of claim 28 further comprising the step of:
 if the monitored rotational velocity of the spindle motor is less than $\omega 2$, braking the spindle motor to reduce the rotational velocity of the spindle motor to zero.

32. The method of claim 28 wherein $\omega 1$ is equal to a maximum rotational velocity of the spindle motor.

33. The method of claim 28 wherein the monitoring step is performed during a coasting of the spindle motor.

34. The method of claim 28 wherein T1 and T2 are fixed.

35. The method of claim 28 wherein T1 and T2 are variable.

* * * * *